(12) United States Patent
Mazor

(10) Patent No.: US 9,773,356 B2
(45) Date of Patent: Sep. 26, 2017

(54) MAINTENANCE OF CORRECT TIRE PRESSURE

(71) Applicant: Anna Mazor, Ness Ziona (IL)

(72) Inventor: Anna Mazor, Ness Ziona (IL)

( * ) Notice: Subject to any disclaimer, the term of this patent is extended or adjusted under 35 U.S.C. 154(b) by 41 days.

(21) Appl. No.: 14/685,830

(22) Filed: Apr. 14, 2015

(65) Prior Publication Data

US 2016/0303924 A1    Oct. 20, 2016

(51) Int. Cl.
| | | |
|---|---|---|
| *G06F 19/00* | (2011.01) |
| *G07C 5/08* | (2006.01) |
| *B60C 23/04* | (2006.01) |
| *B60S 5/04* | (2006.01) |

(52) U.S. Cl.
CPC ............ *G07C 5/08* (2013.01); *B60C 23/0479* (2013.01); *B60S 5/046* (2013.01)

(58) Field of Classification Search
CPC ............ B60C 23/04; B60C 23/00; G07C 5/08
USPC ................................................. 701/34.1–34.4
See application file for complete search history.

(56) References Cited

U.S. PATENT DOCUMENTS

| | | | | |
|---|---|---|---|---|
| 6,441,732 B1* | 8/2002 | Laitsaari | ............. | B60C 23/0401 340/438 |
| 6,459,369 B1* | 10/2002 | Wang | ................. | B60C 23/0401 116/34 R |
| 6,518,877 B1* | 2/2003 | Starkey | ................ | B60C 23/004 340/447 |
| 6,546,982 B1* | 4/2003 | Brown | .................... | B60C 23/04 152/152.1 |
| 8,155,868 B1* | 4/2012 | Xing | .................... | G07C 5/0808 340/439 |
| 2004/0066288 A1* | 4/2004 | Okumura | ............ | B60C 23/0408 340/445 |
| 2009/0171555 A1* | 7/2009 | Hyde | .................... | F02D 41/021 701/115 |
| 2014/0005875 A1* | 1/2014 | Hartmann | ................ | G08G 1/16 701/23 |
| 2015/0059918 A1* | 3/2015 | Schondorf | .......... | B60C 23/0479 141/4 |

* cited by examiner

*Primary Examiner* — Muhammad Shafi

(74) *Attorney, Agent, or Firm* — Occhiuti & Rohlicek LLP

(57) ABSTRACT

An apparatus for setting inflation pressure used to support a vehicle comprising a tire includes an air dispensary, a transponder, and a data-processing system. The transponder is coupled to the air dispensary and to the data-processing system. It receives, from the vehicle, a wireless transmission having first information. The data-processing system executes a host process that receives the first information, and that obtains, based at least in part on the first information, second information. The first information comprises information from which an appropriate inflation pressure for the first tire is obtainable. The second information comprises information indicative of an appropriate inflation pressure for the first tire.

15 Claims, 1 Drawing Sheet

MAINTENANCE OF CORRECT TIRE PRESSURE

FIELD OF DISCLOSURE

This disclosure relates to automotive safety, and in particular, to tire pressure.

BACKGROUND

Correct tire pressure is an often-overlooked part of maintaining optimal performance and assuring safe operation of a car. Correct tire pressure affects the car's gas mileage, its ability to grip the road, and the longevity of the tires themselves.

Ideally, tire pressure should be checked frequently. However, many people do not do so. And many of those who do check simply look at the tire and attempt to judge, from its appearance, whether the tire pressure is correct. Others may press a finger against the tire, as if they were checking a fruit for ripeness, and based on that feel of the tire, proclaim the tire is properly inflated.

These methods are generally not accurate. Proper checking of tire pressure requires measuring the tire pressure and comparing it against a desired tire pressure. This raises another difficulty. Different makes and models of cars have different recommended tire pressures. These are usually printed on a sticker on the driver's door jamb. However, not everybody knows this. Moreover, in some cases, the units of pressure that are printed in the door jamb are inconsistent with the units on a tire-pressure gauge, thus requiring a unit conversion.

To make matters more difficult, the optimal tire pressure can depend on the environment and on road conditions. The information printed on the driver's door jamb represents an optimal pressure for one set of conditions only.

SUMMARY OF THE INVENTION

In one aspect, the invention features an apparatus for setting inflation pressure used to support a vehicle comprising a first tire. Such an apparatus includes an air dispensary, a transponder, and a data-processing system. The transponder, which is configured to receive, from the vehicle, a wireless transmission having first information, is coupled to the air dispensary and to the data-processing system. The data-processing system is configured to execute a host process that receives the first information, and that obtains, based at least in part on the first information, second information. The first information comprises information from which an appropriate inflation pressure for the first tire is obtainable, and the second information comprises information indicative of an appropriate inflation pressure for the first tire. Examples of first information include information concerning a make and model of the vehicle.

In some embodiments, the air dispensary is configured to set a limit pressure thereof to a value equal to the appropriate inflation pressure, whereby when the air dispensary is connected to the first tire, the first tire is inflated to the value.

Other embodiments include a wireless identifier that, in response to interrogation by the transponder, communicates the first information to the transponder. Suitable wireless identifiers include an NFC chip and an RFID chip.

In some embodiments, the wheeled-vehicle further comprises a second tire. In this case, the transponder is further configured to receive, from the vehicle, a wireless transmission having third information from which an appropriate inflation pressure for the second tire can be obtained. The data processor is further configured to receive the third information, and to obtain, based at least in part on the third information, fourth information that comprises information indicative of an appropriate inflation pressure for the second tire. Among these embodiments are those that include a first wireless identifier that, in response to interrogation by the transponder, communicates the first information to the transponder, and a second wireless identifier that, in response to interrogation by the transponder, communicates the third information to the transponder. In some cases, the first wireless identifier is disposed adjacent to a front wheel and the second wireless identifier is disposed adjacent to a rear wheel. Also among these embodiments are those in which the data processing system is configured to receive fifth information that includes information indicative of local environmental conditions for the vehicle. The fourth information is determined based at least in part on the fifth information, and the second information is determined based at least in part on the fifth information.

In some embodiments, the data-processing system is further configured to retrieve third information. The third information comprises information concerning environmental conditions local to the vehicle. The host process obtains the second information based at least in part on the third information.

In another aspect, the invention features a process for setting inflation pressure used to support a vehicle comprising a first tire. Such a process includes receiving first information from a transponder at an air dispensary, sending the first information to a host process, at the host process, obtaining, based at least in part on the first information, second information, and transmitting the second information to the air dispensary. The first information comprises information from which an appropriate inflation pressure for the first tire is obtainable. The second information comprises information indicative of an appropriate inflation pressure for the first tire. Examples of first information include information concerning a make and model of the vehicle.

Some practices include, based on the second information, setting a target pressure at the air dispensary, and causing the air dispensary to dispense air into the tire until pressure in the tire reaches the target pressure.

Yet other practices include those in which receiving the first information comprises interrogating a wireless identifier associated with the first tire.

Still other practices include retrieving third information that comprises information concerning environmental conditions local to the vehicle, and obtaining the second information based at least in part on the third information.

In some cases, the wheeled-vehicle further comprises a second tire. Processes used in these cases include receiving third information from a transponder at an air dispensary, sending the third information to a host process, at the host process, obtaining, based at least in part on the third information, fourth information, and transmitting the fourth information to the air dispensary. The third information is information from which an appropriate inflation pressure for the second tire can be obtained. The fourth information comprises information indicative of an appropriate inflation pressure for the second tire. Among these practices are those that in which receiving first information from a transponder at an air dispensary comprises interrogating a first wireless identifier that provides the first information to the transponder, and receiving third information from a transponder at an air dispensary comprises interrogating a second wireless identifier that provides the third information to the transponder. Also among these practices are those that include receiving fifth information, determining the fourth information based at least in part on the fifth information, and determining the second information at least in part based on the fifth information, wherein the fifth information comprises information indicative of local environmental conditions for the vehicle.

BRIEF DESCRIPTION OF THE DRAWINGS

These and other features of the invention will be apparent from the following detailed description and the accompanying description, in which.

DETAILED DESCRIPTION

Figure 1:
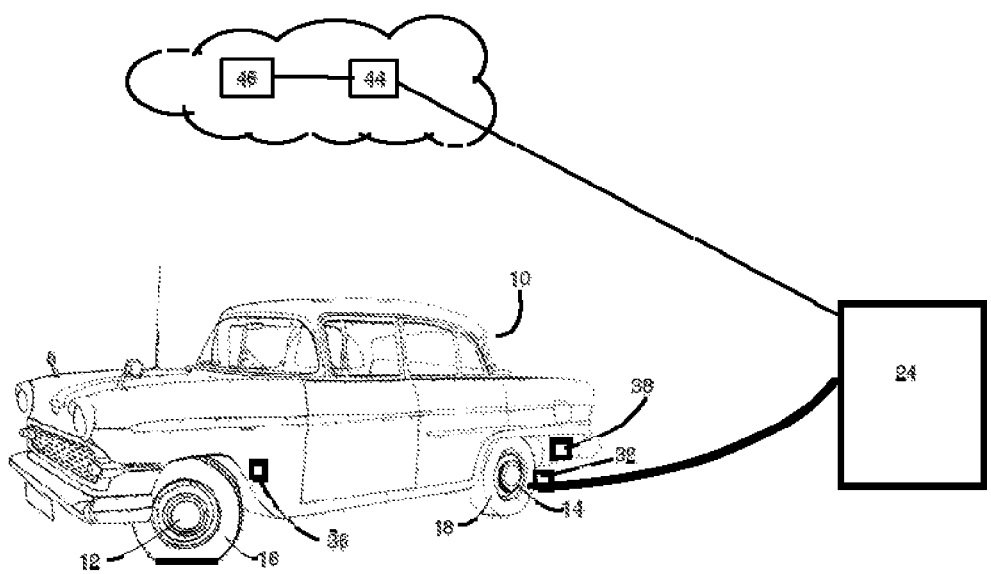
FIG. 1 shows a car using an air dispensary.

FIG. 1 shows a car 10 with a front axle 12 and a rear axle 14. A front tire 16 and a rear tire 18 are attached to the front and rear axles 12, 14 respectively. An additional front tire and rear tire are attached on the other side of the car 10 but cannot be seen in the side view shown.

The car 10 is shown parked near an air dispensary 24 that is configured to supply compressed air for filling a tire. The air dispensary 24 includes a hose 26 that engages a tire valve in a tire.

Near the front tire 16 is a front wireless identifier 36 configured to transmit information identifying the make and model of the car 10 and the fact that the front tire 16 is mounted on the front axle 12. A second wireless identifier 38 is located near the rear tire 20. The second wireless identifier 38 is configured to transmit information identifying the make and model of the car 10, and the fact that the rear tire 20 is attached to the rear axle 14. Additional wireless transmitters are attached to the front and rear tire on the other side of the car 10. These operate in the same way as those shown.

Suitable wireless identifiers 36, 38 include near-field communication ("NFC") chips or RFID chips. Other examples of wireless identifiers 36, 38 include those that are Bluetooth enabled or that communicate via a WiFi network.

In the illustrated embodiment, the air dispensary 24 is an intelligent air dispensary 24 that can communicate with each wireless identifier 36, 38 and also communicate with a hosted application 44 via a WAN. In some embodiments, the hosted application is a cloud-based application.

A transponder 32 located near an end of the hose receives, from the wireless identifier 36, 38, information identifying the make and model of the car 10, as well as the axle with which the wireless identifier 36, 38 is associated. The latter information is important because many manufacturers recommend different tire pressures for tires on different axles.

The transponder 32 transmits the information received from the wireless identifier 36, 38 to the hosted application 44 via the network.

The hosted application 44 has available to it information concerning various cars and corresponding recommended tire pressures. This information can be stored locally or retrieved from other hosted services.

In some embodiments, the hosted application 44 communicates with other hosted services, such as a weather service 46. Information from other hosted services can be used to enable the hosted application 44 to adjust the nominal tire pressure to accommodate environmental factors. For example, if it is known to be very hot at the location of the vehicle 10, the optimal tire pressure may be reduced slightly to accommodate gas expansion due to heat.

The hosted application 44 retrieves the nominal pressures for the front and rear tires of the make and model identified by the wireless identifiers 36, 38. The hosted application 44 then transmits information to the intelligent air dispensary 24 representative of the desired pressure.

The intelligent air dispensary 24 then receives this information and sets itself to the correct pressure.

An apparatus as described herein offers certain advantages. For example, there is no need to manually look up or guess the tire pressure. There is also no need to know how to set up the air dispensary 24 to deliver the correct pressure. Finally, the tire pressure can be adjusted to accommodate environmental conditions.

Figure 2:
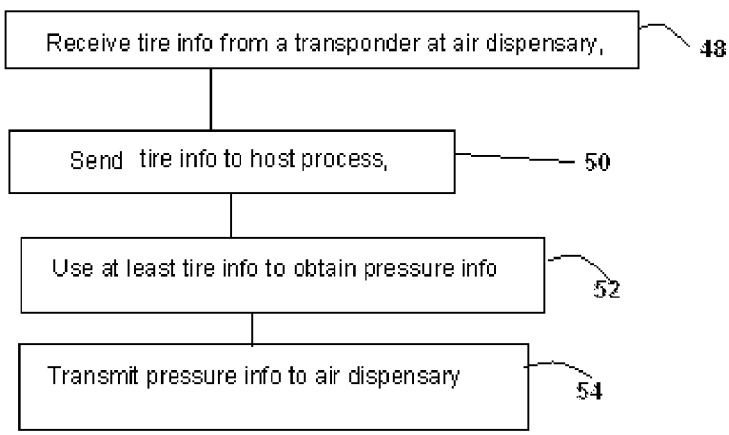
FIG. 2 is a flow-chart for a procedure for determining correct tire pressure.

FIG. 2 shows a method for obtaining correct tire pressure. The process begins with obtaining information from which it is possible to identify the correct tire pressure (step 48). This information is sent to a host (step 50). The host uses at least this information to obtain pressure information (step 52). This pressure information is then sent back to the air dispensary (step 54).

Although the description has been in terms of a car, the subject matter described herein is applicable to any pneumatically-supported wheeled-vehicle having pneumatic tires. These include buses, automobiles, sedans, trucks, motorcycles, scooters, bicycles, motorcycles, golf-carts, and construction equipment, such as bulldozers. It is also intended to encompass wheeled vehicles that are primarily used indoors, such as forklifts, and pneumatically-supported wheeled vehicles that do not necessarily carry people, such as snow-throwers, or wheelbarrows.

Having described the invention, and a preferred embodiment thereof, what is claimed as new, and secured by letters patent is:

1. An apparatus for setting inflation pressure used to support a vehicle comprising a tire, said apparatus comprising:
    an air dispensary,
    a transponder, and
    a data-processing system that hosts a cloud-based application,
    wherein said transponder is coupled to said air dispensary,
    wherein said transponder is coupled to said hosted application,
    wherein said transponder is configured to receive, from said vehicle, a wireless transmission having first information,
    wherein said hosted application is configured to receive said first information by interrogating a wireless identifier associated with said first tire, and to obtain, based at least in part on said first information, second information,
    wherein said first information comprises information from which an appropriate inflation pressure for said first tire is obtainable, and
    wherein said second information comprises information indicative of an appropriate inflation pressure for said first tire that is to be provided to said air dispensary to cause said air dispensary to set a target pressure and to dispense air into said tire until pressure in said tire reaches a target pressure.

2. The apparatus of claim 1, wherein said wireless identifier comprises an NFC chip.

3. The apparatus of claim 1, wherein said wireless identifier comprises an RFID chip.

4. The apparatus of claim 1, wherein said wheeled-vehicle further comprises a second tire, wherein said transponder is further configured to receive, from said vehicle, a wireless transmission having third information, wherein said third information is information from which an appropriate inflation pressure for said second tire can be obtained, wherein said hosted application is further configured to receive said third information, and to obtain, based at least in part on said third information, fourth information, and wherein said fourth information comprises information indicative of an appropriate inflation pressure for said second tire.

5. The apparatus of claim 4, further comprising a first wireless identifier that, in response to interrogation by said transponder, communicates said first information to said transponder, and a second wireless identifier that, in response to interrogation by said transponder, communicates said third information to said transponder.

6. The apparatus of claim 5, wherein said first wireless identifier is disposed adjacent to a front wheel and said second wireless identifier is disposed adjacent to a rear wheel.

7. The apparatus of claim 4, wherein said hosted application is configured to receive fifth information, wherein said fourth information is determined based at least in part on said fifth information, wherein said second information is determined based at least in part on said fifth information, and wherein said fifth information comprises information indicative of local environmental conditions for said vehicle.

8. The apparatus of claim 1, wherein said hosted application is further configured to retrieve third information, wherein said third information comprises information concerning environmental conditions local to said vehicle, and wherein said hosted application obtains said second information based at least in part on said third information.

9. The apparatus of claim 1, wherein said information from which an appropriate inflation pressure for said first tire is obtainable comprises information concerning a make and model of said vehicle.

10. A process for setting inflation pressure used to support a vehicle comprising a first tire, said process comprising causing a data-processing system that is hosting a cloud-based hosted application to execute the steps of: receiving first information that has been wirelessly sent to said cloud-based hosted application by an air dispensary that has received said first information from a transponder at said air dispensary after having interrogated a wireless identifier associated with said first tire, at said hosted application, obtaining second information based at least in part on said first information, transmitting said second information to said air dispensary, and said air dispensary setting a target pressure based at least in part on said second information and dispensing air into said tire until pressure in said tire reaches said target pressure as a result of having received said second information, wherein said first information comprises information from which an appropriate inflation pressure for said first tire is obtainable, and wherein said second information comprises information indicative of an appropriate inflation pressure for said first tire.

11. The process of claim 10, wherein said wheeled-vehicle further comprises a second tire, said process further comprising receiving third information from a transponder at an air dispensary, sending said third information to said hosted application, at said hosted application obtaining, based at least in part on said third information, fourth information, and transmitting said fourth information to said air dispensary, wherein said third information is information from which an appropriate inflation pressure for said second tire can be obtained, and wherein said fourth information comprises information indicative of an appropriate inflation pressure for said second tire.

12. The process of claim 11, further comprising receiving first information from a transponder at an air dispensary comprises interrogating a first wireless identifier that provides said first information to said transponder, wherein receiving third information from a transponder at an air dispensary comprises interrogating a second wireless identifier that provides said third information to said transponder.

13. The process of claim 11, further comprising receiving fifth information, determining said fourth information based at least in part on said fifth information, and determining said second information at least in part based on said fifth information, wherein said fifth information comprises information indicative of local environmental conditions for said vehicle.

14. The process of claim 10, further comprising retrieving third information, wherein said third information comprises information concerning environmental conditions local to said vehicle, and obtaining said second information based at least in part on said third information.

15. The process of claim 10, wherein receiving said first information comprises receiving information concerning a make and model of said vehicle.

* * * * *